March 15, 1932.   H. BACHMANN   1,849,728

TAPER PIN

Filed Nov. 22, 1930

Inventor:
Heinrich Bachmann

Patented Mar. 15, 1932

1,849,728

UNITED STATES PATENT OFFICE

HEINRICH BACHMANN, OF MAGDEBURG, GERMANY

TAPER PIN

Application filed November 22, 1930, Serial No. 497,514, and in Germany April 1, 1930.

This invention relates to a taper pin with axial bore and longitudinal slot for locally fixing two machine parts with cylindrical bores. In the conical pin hitherto known, serving for connecting two parts, the bores into which the pins are driven must first be drilled cylindrical and then reamed conical. This operation wastes time and, unless the work is carried out very accurately, does not produce a perfect connection. The pin according to the invention serves for overcoming these objections and is so constructed, that it is possible to connect two parts without first reaming conical the cylindrical bores.

Two embodiments of the invention are illustrated by way of example in the accompanying drawings in which.

Figure 1:
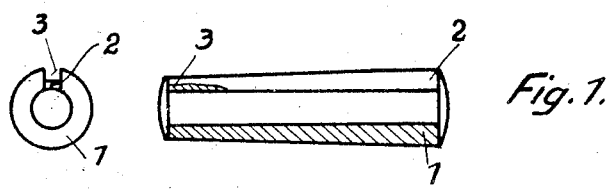
Fig. 1 shows in longitudinal section a taper pin composed of a conical tube with a longitudinal slot.

The pin according to Fig. 1 consists of a conical tube 1 provided with a longitudinal slot 2. On the narrower end of the pin the slot extends into a groove 3 gradually becoming shallower. The section of the thinner end need not be larger than the diameter of the bore of the hole, in which the pin is to be inserted as the pin, at the point where the groove is situated, does not tend to spring outwards, but inwards, when being driven into the bore.

The pin need not however consist of a tube, but may be made of solid material 1a, which is bored longitudinally almost its entire length. A pin of this type, which in other respects does not differ from that shown in Fig. 1, is illustrated in Fig. 2.

Figure 2:
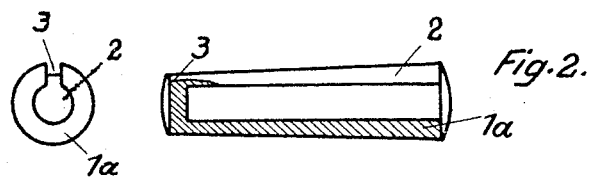
Fig. 2 shows in a similar view to that of Fig. 1 a taper pin with a central bore and a longitudinal groove.
Figure 3:
Fig. 3 shows the fitting of such a pin in two parts with cylindrical bores.

If according to Fig. 3 two parts A and B are to be connected by a taper pin, only a cylindrical bore C is necessary, into which the pin according to Fig. 1 or 2 is driven. As the pin is hollow and is tapered its whole length and split, the wall is pressed together circumferentially on the pin being driven in, that is adapts itself perfectly to the cylindrical bore in the parts A and B and thereby ensures a secure and lasting connection.

I claim:—

1. A taper pin for locally fixing two machine parts provided with cylindrical bores, comprising a tapered tube provided with a longitudinal slot merging towards the thin end of the like into a groove.

2. A taper pin, comprising a tapered body having a longitudinal slot merging at the thin end of the pin into a groove so that a solid wall is formed at this thin end.

In testimony whereof I affix my signature.

HEINRICH BACHMANN.